July 30, 1935.  N. E. RAMBUSH ET AL  2,009,786
WATER GAS PLANT
Filed Feb. 29, 1932   3 Sheets-Sheet 3
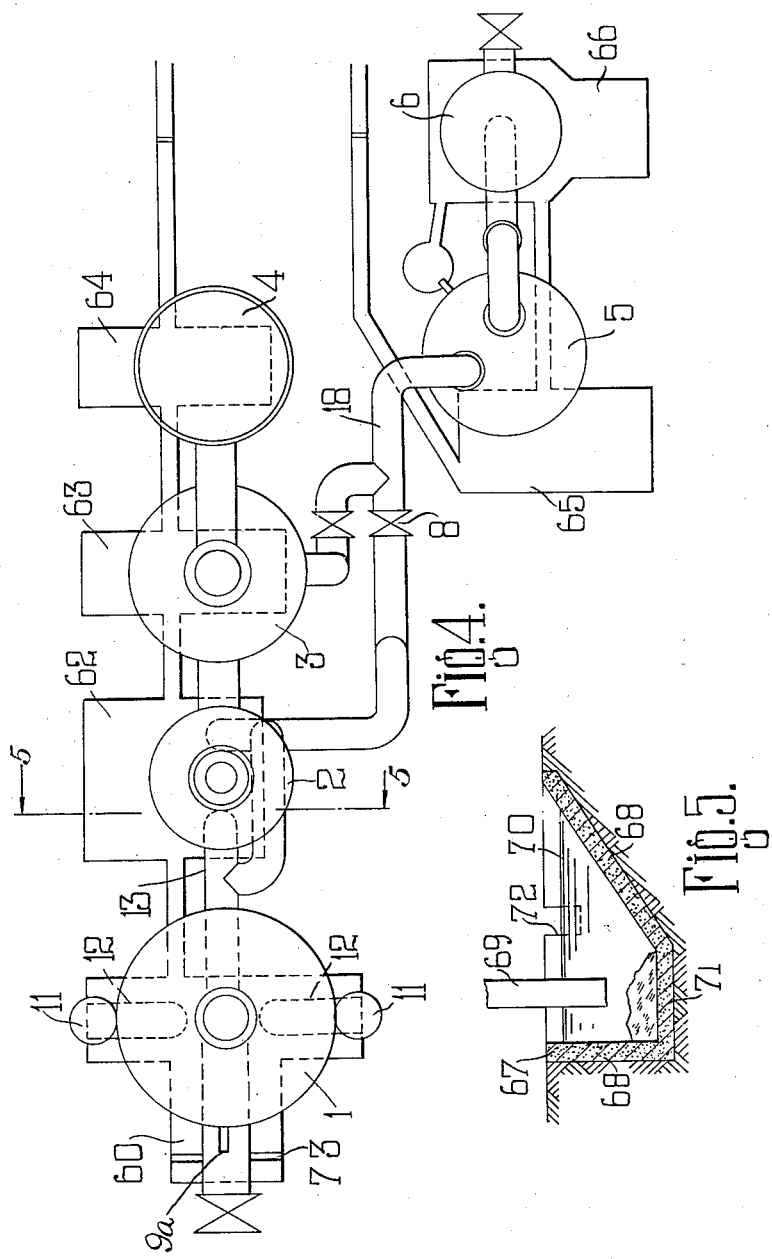
INVENTOR
Niels E. Rambush
James M. Ballingall
BY
Sturtevant, Mason & Porter
ATTORNEYS Patented July 30, 1935

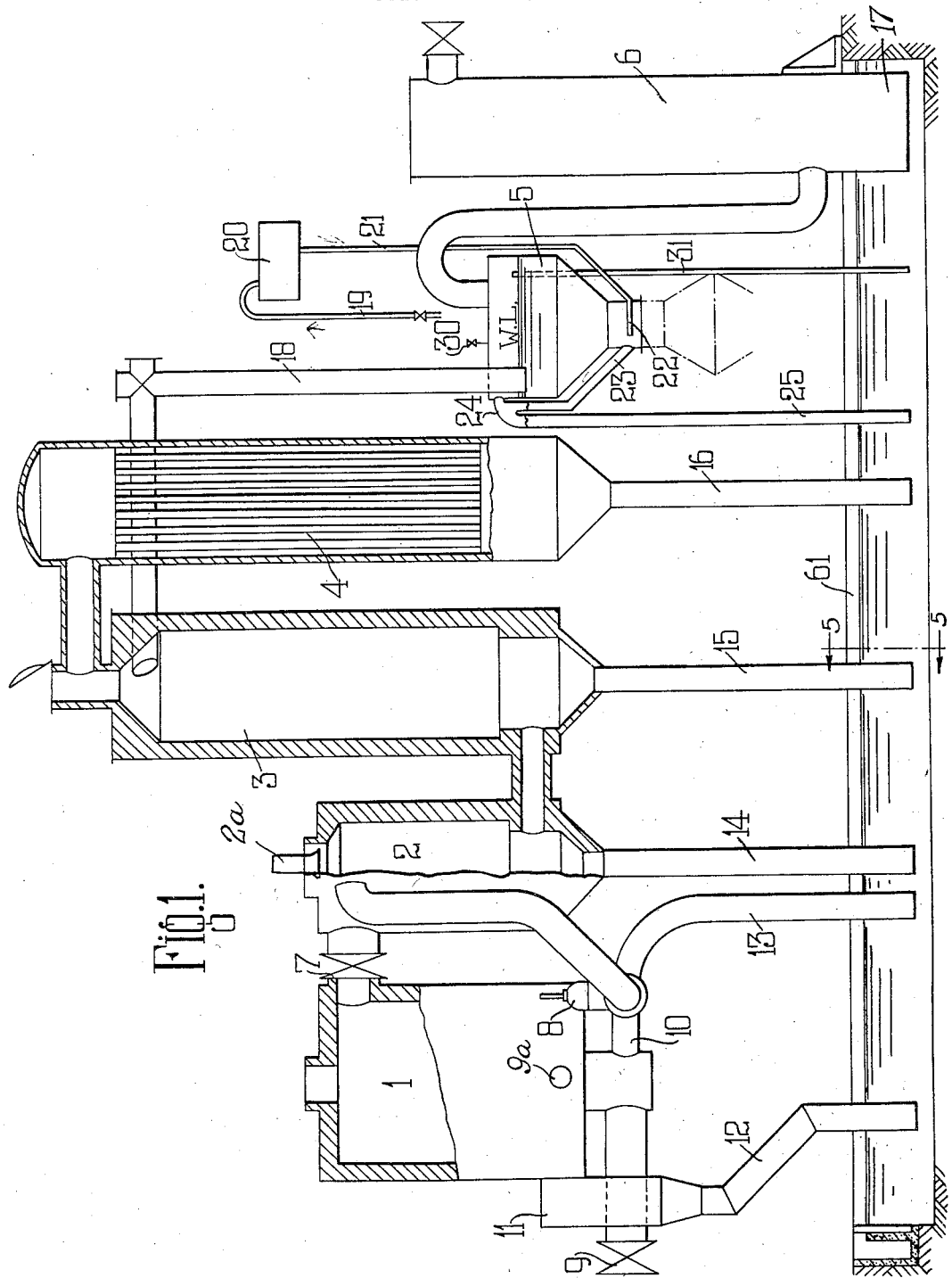

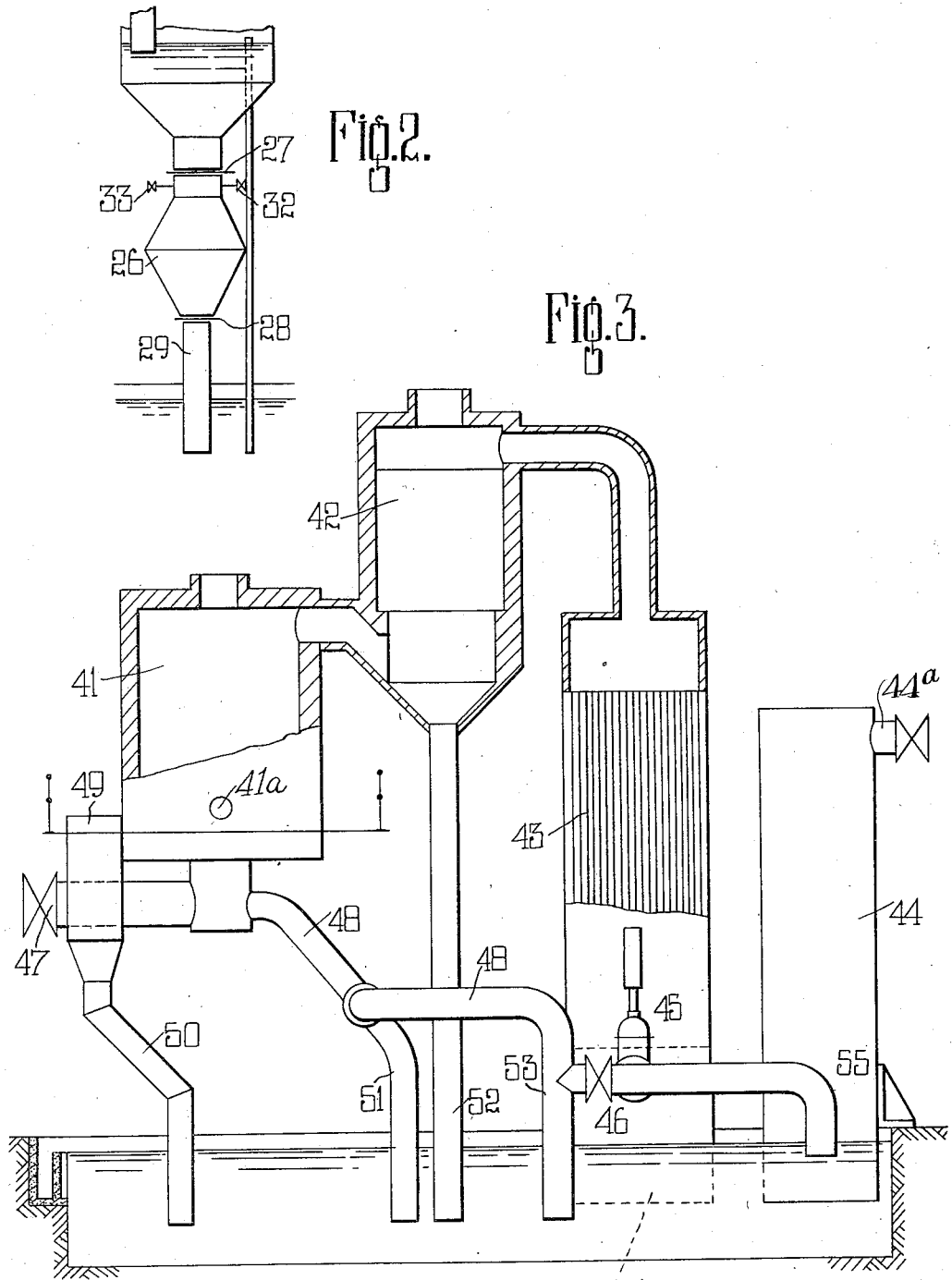

2,009,786

UNITED STATES PATENT OFFICE 2,009,786

WATER GAS PLANT

Niels Edward Rambush and James Mackay Ballingall, Stockton-on-Tees, England, assignors to The Power Gas Corporation Limited, Stockton-on-Tees, England, a British Company Application February 29, 1932, Serial No. 595,946
In Great Britain March 6, 1931

2 Claims. (Cl. 48—80)

The present invention relates to the provision of water seals as combined dust removal and safety devices for water gas plants in which the air blow period is intermittent.

In the operation of gasification plants it is well known that one of the troubles met with is the production of dust, soot or tar which passes forwards from the fuel bed or gasification chamber. These dust particles carried forward by the stream of gas through the connecting pipes scour and wear the pipe surfaces, valve faces, and other surfaces in their path or they may deposit in pockets, passage-ways or vessels and so restrict or block the passage of gas.

Dust and the like tends to deposit at places where the gas stream changes its direction or is reduced in velocity. It has therefore been customary to provide cleaning doors at these points, but these have the disadvantage that the plant must be put on stand-by during the cleaning process, and the air admitted is liable to cause an explosion.

It has been proposed to provide water seals on the grates of water gas generators, for the purpose of allowing the free rotation of the grate.

It has also been proposed to employ water seals for dust removal purposes on suction gas plants. These however work continuously so that there is little danger of an explosion.

Water gas plants strictly so-called however, work intermittently, during one period steam is admitted to the generator, and the resulting water gas flows through all the other vessels, while during the following period air is admitted to the generator and several other vessels. The tendency to form explosive mixtures is therefore considerably greater than with a suction gas plant. Every point where air is admitted may be considered a potential explosion zone. The water gas plant operates under pressure, which in some cases may reach 80–100 inches of water.

According to the present invention, in plants for the production of water gas of the above type, water seals are provided on ducts leading downwards from zones of potential explosion into a water receptacle or receptacles for the purposes of guarding against explosion and allowing of dust removal.

The dust may then be removed from the troughs manually or mechanically or otherwise. The whole of the dust may be handled and removed from the trough by one mechanical device, or the conduits may be arranged in groups with one dust handling device to each group or again each individual conduit may be provided with its own dust handling device. It will also be understood that in conjunction with the above one trough may be provided for all the conduits, or separate troughs for groups of conduits, or separate troughs for each conduit.

For instance from some of the conduits there may be an efflux of tar or tar and water, and such conduits may be grouped together and separate from the others, which contain water and dust only, so that in the later treatment of the efflux to separate the tar from the water the bulk to be dealt with can be kept at minimum quantity.

The invention will now be described with reference to the accompanying drawings of which:—

Figure 1 is an elevation partly in section, of a carburetted water gas plant,

Figure 2 shows a side view of a modified form of dust and tar discharge device from the seal box, Figure 3 an elevation partly in section of a blue water gas plant, Figure 4 a plan view of a further carburetted water gas plant, and Figure 5 a section of a trough on lines 5—5 of Figs. 1 and 4.

In Figure 1, 1 is the generator with steam inlet 9a, 2 the carburettor with oil inlet 2a, 3 the superheater, 4 the waste heat boiler, 5 the seal box, 6 the gas washer, 7 the top gas valve, 8 the bottom gas valve, and 9 the primary air valve. Other parts of the plant such as the secondary air valve, the sprayer and stack valve etc. are not shown on the figure, as they have no connection with the present invention, 10 is a bottom gas outlet, 11 is an ash box, of which there are generally two to each generator. 12, 13, 14, 15 and 16 are conduits for conducting ash and dust from the respective vessels and pipes to the water trough 61. 17 is the extended shell of the washer which is already at the ground level.

Two methods of removing the dust are shown namely through the ducts 12—16 and by means of the seal box 5. The latter is only used when tarry matters are also present e. g. when making carburetted water gas. 5 contains water up to the level W. L. which level is maintained by allowing water to flow into the vessel through a valved connection 30 and to flow out through a connection 31, as is well understood. 18 is a down-comer pipe with its lower end continuing below the top surface W. L. of the water so forming a seal and preventing any back passage of gas from 5 to 18. In order to maintain the water at the level W. L. and still remove dust, tar, pitch or other matter that may have entered 5 from 18, a nozzle 22 is provided at the bottom of the seal box 5, which is connected by a flushing pipe 21, to a flushing tank 20. The flushing tank is fed by the valved connection 19, the rate at which the flushing tank is fed being regulated by the regulating cock shown.

In front of the nozzle 22 is a sludge outlet 23, leading through cleaning box 24, to down pipe 25, whose lower end is sealed in the water of the dust trough. There is a communicating hole between 24 and interior of seal box 5, to equalize the pressure in 24 and 5, and prevent this part of the system acting as a syphon to empty the seal box 5.

In operation dust or tar collects round about nozzle 22, at the bottom of seal box 5, whilst at the same time flushing tank 20, is being slowly filled through valve and pipe 19. When tank 20 is full it discharges its water through pipe 21, and nozzle 22, into sludge outlet 23, cleaning box 24 and down pipe 25. The end nozzle 22 is arranged in or near the bottom of sludge outlet 23, so as to set up an ejector action there, and so carry the water from the bottom of seal box 5 loaded with tar or dust, up sludge pipe 23, and eventually to the water trough as described.

Or again, as shown in Figure 2 to the bottom of the seal box may be fitted a valve 27, a discharge chamber 26, a lower valve 28, and a dip pipe 29.

With this arrangement the top valve 27, is normally open, any tar sludge or dust trapped in the seal box 5 will settle in chamber 26.

To empty chamber 26, valve 27 is closed, valve 28 opened, vent cock 33 opened and thus the contents of chamber 26 fall into the water trough. Valve 28 will now be closed and water inlet cock 32 is now opened allowing chamber 26 to fill with water. Top valve 27 is then opened and vent cock 33 closed. The seal box and chamber will then have resumed their normal position to guide any dust, tar or sludge into chamber 26.

In Figure 3, 41 is a generator with steam inlet 41a, 42 a recuperator, 43 a waste heat boiler, 44 a washer supplied with water through the pipe 44a, 45 a top gas valve, 46 a bottom gas valve, 47 a primary air valve, 48 a bottom gas outlet and 49 an ash box, forming part of a blue water gas plant, as is well known.

50, 51, 52 and 53 are conduits for conducting ash from the ash box, bottom gas outlet, recuperator and bottom gas outlet again respectively, 54 and 55 are extended shells for the waste heat boiler and the washer respectively.

In both Figure 1 and Figure 3, the conduits or extended shells all dip into the water in the trough to a sufficient depth to prevent the escape of gas as long as the pressures inside the plant do not exceed those necessary for the ordinary working of the plant. If the pressure rises above normal say by the ignition of an explosive mixture inside the plant the seals will be blown and the pressure will be released, indeed the internal pressure will not attain so high a degree as would be the case if the plant were entirely closed, so that these sealed dust conduits also act as safety devices in case of explosion.

In Figure 3, the arrangement of conduits is such that the gas has been directed downwards to the conduits at least twice before it passes through the valves 45 and 46. The gas will therefore have lost most of its dust before having to pass through the valves. This results in a considerable reduction in the wear and tear on these valves with a corresponding lengthening of their lives and increase of efficiency of the plant operations owing to these valves maintaining their gas tightness for much longer periods. It must be understood that this arrangement of conduits is equally applicable to the plant shown in Figure 1.

Figure 4 is a plan view of an apparatus as in Figure 1 but with the conduits arranged as in Figure 3. The components of the apparatus are arranged over two lines of troughs 60, 62, 63, 64 and 65 and 66.

On the one line the water enters at 60 so that all the troughs may be fed and the conduits sealed by the same water supply and have the water level regulated by the same weir. This weir may consist of a dwarf wall 73 built across the final channel to the desired level. The water supplied to these troughs need only be enough to prevent stagnation and to make up any waste due to spillage during extraction of the dust.

The other line consists of two troughs 65—66 under the seal-box and washer respectively. The water is provided by the efflux from the washer, and flows through the connecting channel, through the seal box trough 65 and out through the exit channel over a weir. As shown this weir need only be dwarf wall, but if a dip pipe is provided for the gas passage in the washer, it may be an adjustable weir.

The liquid from this line of trough is a mixture of tar and water which requires to be led to a separating tank, so that it is desirable to keep the liquid separate from the sealing water in the other troughs. This has also the advantage of confining the liquid to a small area in the house.

Figure 5 shows a section through one of the troughs at AA. 67 is the ground level. 68 are the trough walls. 69 is the conduit. 70 is the water level. 71 are the ashes. 72 is the communicating channel between troughs and in the final channel a dwarf wall may be built up to a level 70 to form the weir already referred to. The form of trough shown is more particularly suitable for removal of ashes by hand, one side of the trough being sloped to allow the ashes to be dragged up the incline by any suitable form of tool. It will be seen from this view that the ashes can be removed at any time without shutting down the plant for the purpose.

We declare that what we claim is:—

1. A water gas plant comprising a generator, a carburettor, a superheater and a liquid seal trough, unobstructed conduits from said generator, said carburettor and said superheater to said liquid seal trough forming dip pipes therein, means consisting of an intermittently flushed seal box for supplying liquid to said trough and a weir for regulating the level of the liquid in said trough.

2. A water gas plant comprising a generator, ash boxes on said generator, a bottom gas valve, a carburettor, a superheater, a waste heat boiler, an intermittently flushed seal box, and a washer, and a liquid seal trough, unobstructed conduits from said ash boxes, said bottom gas valve, said carburettor, said superheater and said waste heat boiler to said trough forming dip pipes therein, a second liquid seal trough, unobstructed conduits from said seal box and said washer to said second trough, also forming dip pipes therein, means for supplying liquid to said troughs, and weirs for regulating the level of liquid in said troughs.

NIELS EDWARD RAMBUSH.
JAMES MACKAY BALLINGALL.